Patented Apr. 2, 1935

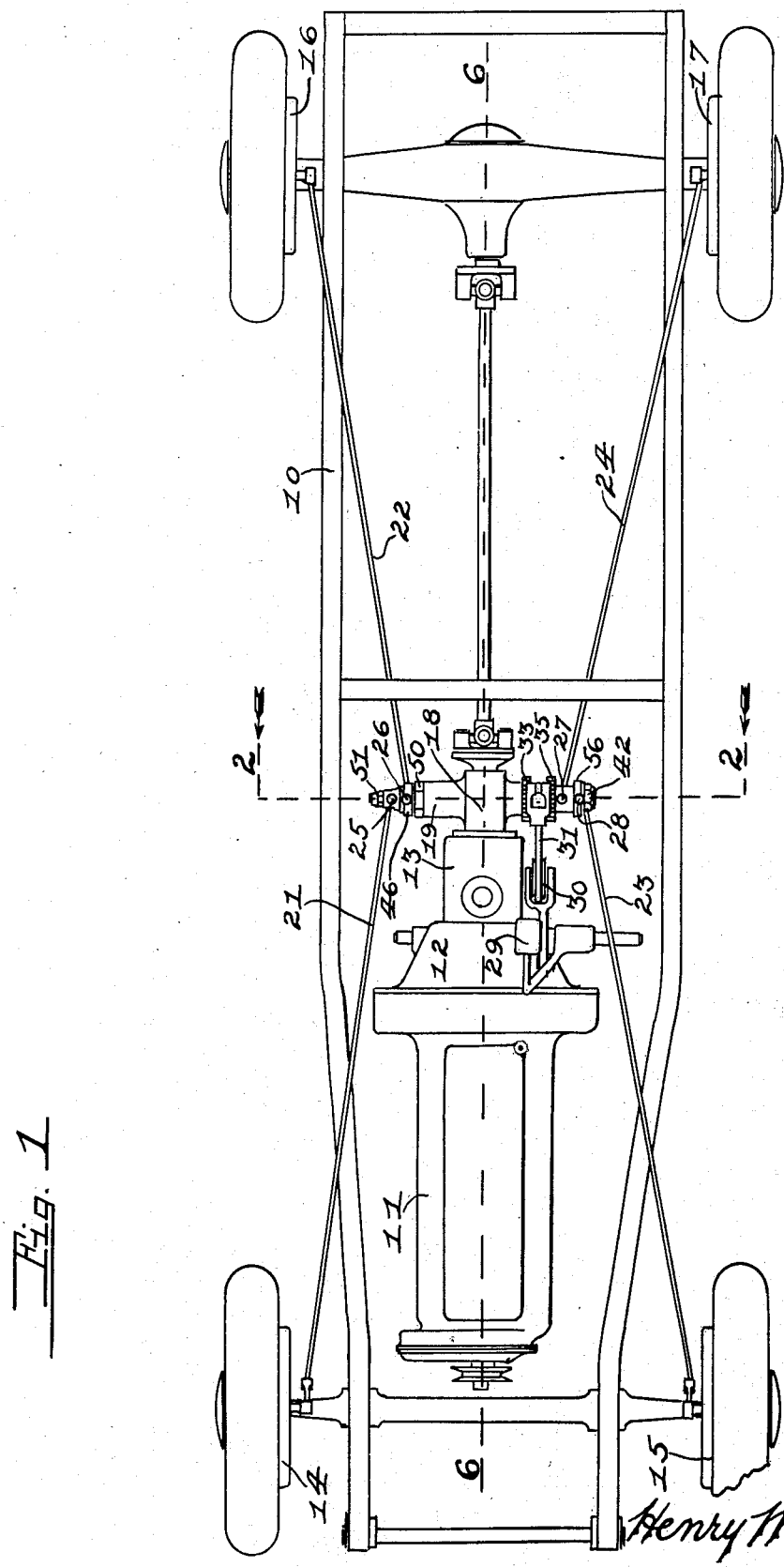

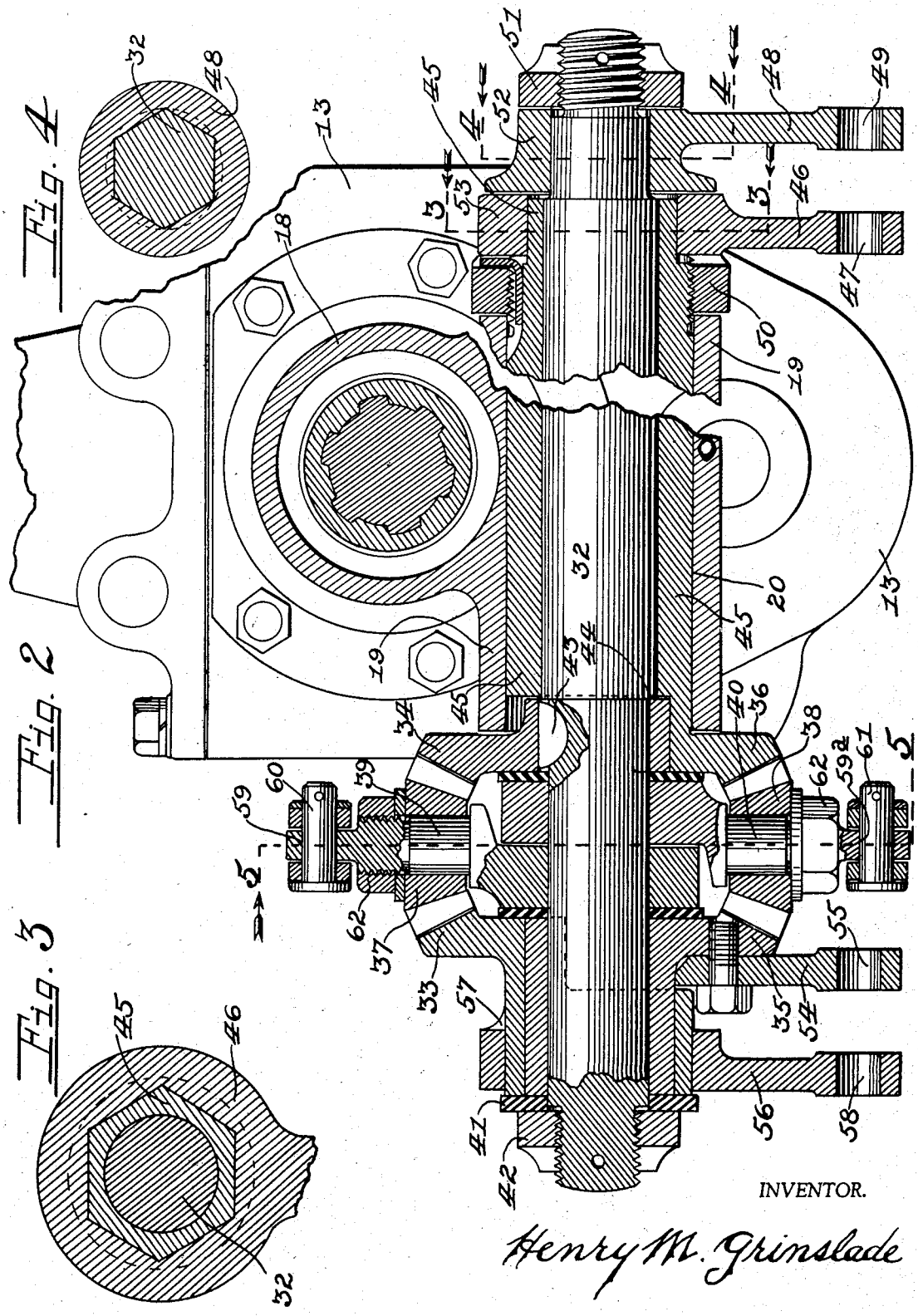

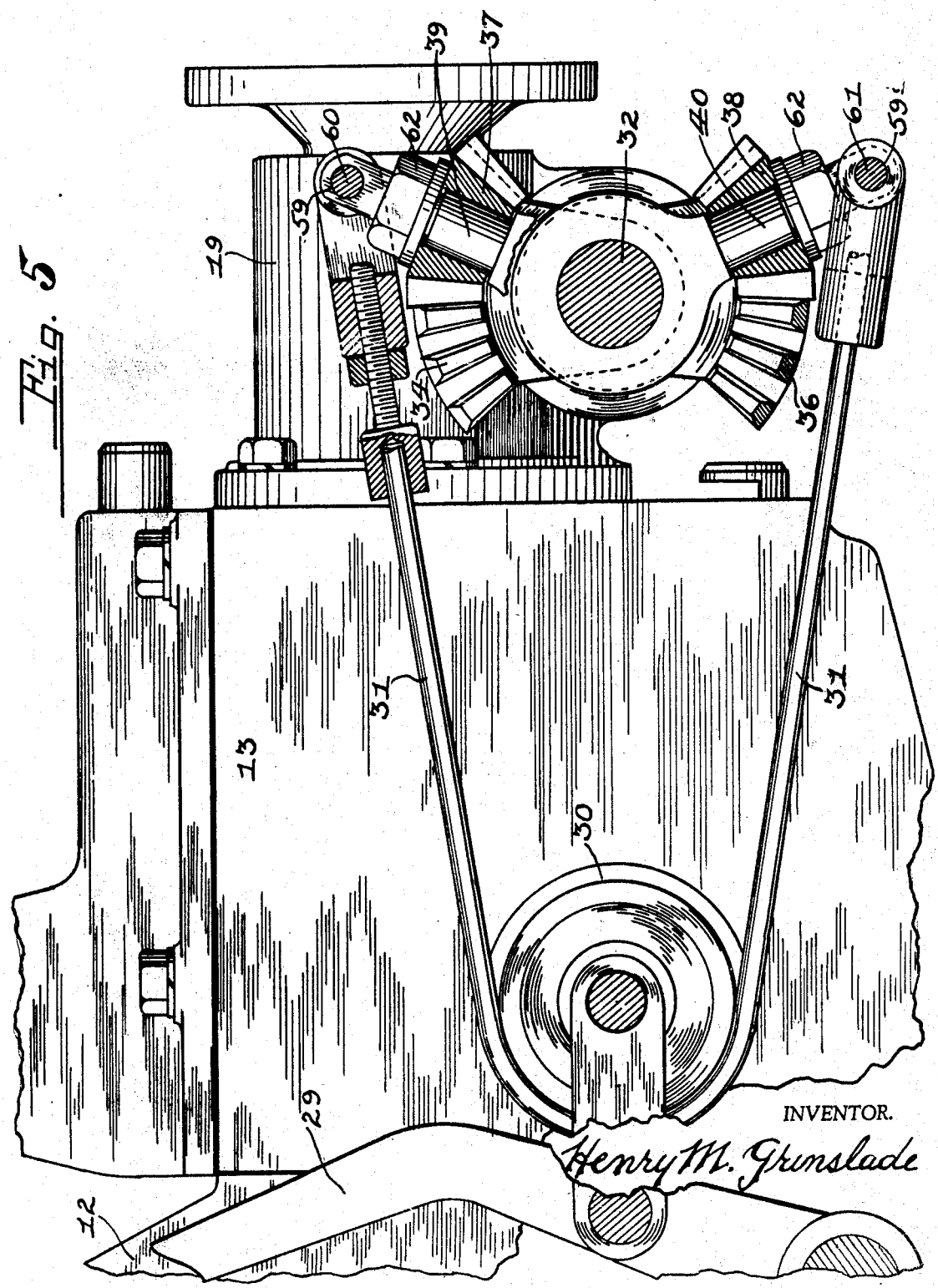

1,996,332

UNITED STATES PATENT OFFICE 1,996,332

BRAKE EQUALIZING MECHANISM

Henry M. Grinslade, Los Angeles, Calif.

Application September 12, 1933, Serial No. 689,095

20 Claims. (Cl. 188—204)

This invention relates to brake applying force transmitting and equalizing mechanism for general adaption, but herein more particularly designed for use in connection with the separate four wheel brakes of a motor vehicle.

In the simple conventional mechanisms for mechanical transmission and distribution of brake applying force between a single point to which the force is initially applied and a plurality of separate brake mechanisms, such as between the foot pedal and the four wheel brakes of an automobile, unequal wear of the brake lining necessitates frequent adjustment of the multi-connections, respectively as they wear differentially, to obtain equal braking on all four wheels. Differential gear mechanisms have been devised to obtain improved equalization, over the practiced rod and lever forms of mechanical brake applying mechanisms, by providing means allowing for a differential degree of motion relatively between all the separate four wheel brake mechanism applying connections in accordance with long and short motions required to apply a given braking force to separate wheels due to adjustments becoming unbalanced, as between separate four wheel brakes and the single applying element, and as incurred by uneven wear of the different wheel brake linings. Heretofore, adaptations of a differential gear medium for obtaining equalization in braking force transmission in the mechanical brake realm have embodied multiples of separate unit gear differentials, some utilizing two and others three separate axial operating gear structures operatively interconnected or single unitary assemblies which include a plurality of planetary compensating gearing systems. Their excessive cost of manufacture, due principally to multiplicity of parts and duplication rendered such forms impractical for general adoption to motor vehicles, especially to vehicles in the lower priced brackets.

It is a principal object of the present invention therefore to provide a brake equalizing mechanism of the gearing type by which the four wheel brake mechanisms may be actuated so that the brake mechanisms of all four wheels will individually adapt themselves to conditions of wear and adjustment at each wheel, and will simultaneously act with equal braking force at all of the wheel brake surfaces, and to obtain these results through the medium of a single planetary gearing of the fewest possible moving parts.

Accordingly, the present invention contemplates the provision of a brake equalizing mechanism comprising a single planetary gearing unit having four segmental sun gear members mounted for rocking movement around a common axis, and to provide two planet gear members to cooperate therewith, one planet gear serving as an actuator to one and the other planet gear serving as an actuator to the other pair of the four segmental sun gears, and of a form, combination and arrangement whereby simultaneous orbital movement of the two planet gears will actuate all four of the sun gear members and permit differential individual segment sun gear response in accordance with the degree of movement required respectively by each sun gear segment to effect a given degree of brake effecting force upon its associated separate brake mechanism.

Another object of the invention is to provide a primary equalizer between the single brake control member and the singular planetary gearing provision for the equalizing of force applied to the two independently orbitally movable planet gears thereof. Accordingly the present invention secondarily contemplates the provision of a single pulley in connection with the single brake control member and a cable engaging this pulley and connecting at its two ends respectively to the carriers of the two planet gear members of the gearing, whereby the two planet gears are permitted to respond to the common pull of the pulley with a differential of orbital movement and thus give a balanced force urge to the respective pairs of sun gear segments engaged with each of the two planet actuator gears. The combination, of the pulley and cable forming an inexpensive but effective two point primary equalizer, and the novel segmental sun gear construction of a single planetary gearing forming the least expensive but effective four point secondary equalizer, in the aggregate forming means for obtaining full four wheel brake actuating compensation mechanically of the simplest and least expensive of manufacture and of greatly reduced displacement and weight, as compared with prior devices for mechanically obtaining similar results.

Still another object of the present invention is, to provide for, and mount, the single planetary gearing brake force compensating system with its operating axis transversely with respect to the longitudinal plane of the vehicle frame, so as to obtain uniformity of transmission points relatively between rocking and straight-line motions in each separate four wheel brake mechanism connection, and of front and rear wheel brakes respectively of given sides of the vehicle, respectively, at equal distances to each side of the longitudinal center line of the vehicle, whereby equal angularity of connections between the gear differential equalizing unit and the separate wheel brake mechanisms, respectively of given sides of the vehicle, are obtained. The present invention, in this connection contemplates providing a transverse journal bearing on the under side of the rearward power transmission gear box end casting, and to mount the planetary gearing secondary compensating system for rocking movement therein. This novel arrangement of the planetary gearing brake compensating system, simplifies its application and bears many advantageous resultants.

The invention is illustrated by way of example in the accompanying drawings in which:

Figure 1 is a plan view showing the brake equalizer device, its location in the vehicle chassis, and as connected with the individual brake levers, or cables, of separate four wheel brakes.

Figure 2 is a view in transverse vertical section taken on line 2—2 of Fig. 1.

Figure 3 is a vertical section taken on line 3—3 of Fig. 2.

Figure 4 is a vertical section taken on line 4—4 of Fig. 2.

Figure 5 is a longitudinal elevational view, partly in section, taken on line 5—5 of Fig. 2.

Referring to the drawings, and for the present particularly to Fig. 1, 10 designates a vehicle frame supporting, respectively, the customary engine, clutch and power transmission units 11, 12 and 13. Four wheel brake mechanisms are indicated by the numerals 14, 15, 16 and 17. 14 and 15 indicating the front and 16 and 17 the rear. 18 indicates the customary power transmission gear box end casting to which the present invention contemplates the provision of a transverse boss 19 providing a transverse journal bearing 20 to accommodate the principal object single distributor unit gear differential brake equalizing device being mounted advantageously in the vehicle chassis. 21 and 22 indicate rods, or cables, respectively connecting the front and rear wheel brake mechanisms 14 and 16 on one side to the unitary brake compensating system, and 23 and 24 indicate rods, or cables, respectively connecting the front and rear wheel brake mechanisms 15 and 17 on the other side to the compensating system. By this mounting of the brake equalizing device it will be seen that the connections 21 and 22, respectively, to front and rear wheel brake mechanisms on one side, and the connections 23 and 24, respectively, to front and rear wheel brake mechanisms on the other side, are of uniform angularity and length, due to equal distancing of the transmission points 25, 26, 27 and 28, respectively between separate differential gear members (rock motion) of the brake equalizing device and the rods, or cables, (straight-line motion) to the respective wheel brake mechanisms.

The customary brake pedal (single control member) 29 is mounted for rocking movement on the side of the clutch housing 12, and to this single control member 29 is operatively connected a pulley 30 engaging a cable 31 to provide a primary equalizing actuating unit to the single planet gearing assembly.

Line 6—6 of Fig. 1 indicates a central longitudinal line transversely of the vehicle and with respect to the change motion transfer points 25, 26, 27 and 28 therewith, illustrates the uniform movement distributions obtained in the connections between the gearing brake equalizer and the separate four wheel brakes. By virtue of this novel mounting subject of the present invention it will be apparent from this illustration that the present invention lends itself to operation by either the well known "Vacuum Booster" or "Full Power" braking energizing devices, particularly to the latter type located at the rear of the power transmission gear box 13.

Referring now more particularly to Figures 2, 3, 4 and 5, 32 indicates a shaft extending through a bearing 20 provided in the rear casting 19 of the vehicle transmission gear box 13. A sleeve shaft 45 surrounds the shaft 32 as a bushing thereto in the bearing 20. Thus the two concentric shaft members 32 and 45 are each mounted for relative rock movement.

A double differential system is provided preferably in the form of a single bevel toothed type of planetary gearing comprising two side differential gearing elements acting as axially tandem sun gears to a single planet gearing element. Forming a principal object of the present invention, this single planetary gearing unit is novelly broken up in segmental relative moving parts consisting of two substantially quadrantal-shaped bevel sun gears 33 and 35 forming one differential side gearing element and two other similarly shaped segmental relative moving parts consisting of bevel sun gears 34 and 36 forming a second differential side gearing element and two bevel planet gears 37 and 38 adapted to be moved orbitally relatively with respect to each other and each engaging one sun gear segment of each of the two segmental differential side gearing elements. The two segmental sun gear members of each given one of the two differential side gear elements to the planet gearing element are mounted for independent rocking movement in a common side gearing rock movement plane around the axis of the shaft 32. Two radial spindles 39 and 40 are provided and respectively mounted for independent rocking movement in a common rock movement plane between the two rocking planes of the two segmental differential side gearing elements thereto, one of these spindles carrying one and the other the second of the two planet gear members 37 and 38 respectively for rotation around their respective spindle axes. It will be obvious that by simultaneously pulling on the two planet gears 37 and 38 they will act respectively to urge their two engaging segmental sun gear members of the two differential side gearing elements to rock with them, but with each planet gear permitting a differential of response between its two engaging sun gear segments. The two planet gears being novelly independently orbitally movably mounted, and the differential side gear elements of the sun gears therewith being novelly independently movably broken up into four segments, affording a four point differential, or compensating system, from a single planetary system.

For equally urging the two relative orbital movement planet gear spindles 39 and 40 to move simultaneously, a pulley 30 is provided and linked to the customary brake lever 29 and a cable 31 is provided in engagement with this one pulley and connected at its two ends respectively to the spindles 39 and 40. The latter connections preferably being accomplished by bearings 59 and 59a respectively formed in the outer ends of the spindles 39 and 40. These bearings for receiving pins 60 and 61 respectively linking the blocked ends of the cable 31 to the spindles. By this primary actuator means it will be obvious that a pull on the pulley 30 by the brake lever 29 will be equally urged upon the two differential planet gear spindles 39 and 40.

Four levers 46, 48, 54 and 56 are provided and preferably arranged in side pairs, the levers 48 and 46 being disposed on one side of the vehicle transmission axis line 6—6 and respectively forming first brake connection members respectively for the right side front and rear wheel brake individual connections 21 and 22, and the levers 56 and 55 being disposed on the opposite side of the vehicle transmission axis line 6—6 and respectively forming first brake connection members respectively for the left side front and rear wheel brake individual connections 23 and 24.

A suitable practice for adapting each of the four segmental sun gears to actuate a separate one of the four levers 46, 48, 54 and 56, so that the simultaneous rocking movement of the two upper sun gear segments 33 and 34 forwardly and the two lower sun gear segments 35 and 36 forwardly will, with the levers 46, 48, 54 and 56 all turned downwardly, cause the front brake connections 21 and 23 to be pulled rearwardly and the rear brake connections 22 and 24 to be pulled forwardly, follows: The sun gear segment 34 is fixed by a key 43 to the shaft 32, the sun gear segment 36 preferably forming a part of the sleeve 45, the sun gear segment 33 having a hub portion carrying the lever 56 in welded connection therewith at 57, and the lever 54 bolted to the sun gear segment 35. Referring to Fig. 3, the axis end 53 of the lever 46 is shown to have a hexagonal opening fitting over a corresponding periphery of the end of the sleeve 45. And referring to Fig. 4, the axis end 52 of the lever 48 is shown to have a hexagonal opening fitting over a corresponding periphery of the shaft 32.

A suitable practice for endwise securing the various moving members making up the gearing in their respective longitudinal positions follows: The shaft 32 is reduced and the sleeve 45 is increased in diameter at 44 and the hub portion of the sun gear segment 34 abuts this differential of diameters 44 of the shaft and sleeve 32 and 45. A washer 41 abuts the outer ends of the hub portions of the sun gear segments 33 and 35, and a nut 42 threaded on the coincident end of the shaft 32 and engaging the washer 41 acts to hold the assembly of segmental sun and planet gear spindles in longitudinal position between the abutted differential of the shaft and sleeve diameters 44 on one end and the shaft 32 on the other end. The broadside faces of both sun gear segments 34 and 36 abut the coincident end of the stationary hub 19 of the bearing 20, a nut 50 threaded on the outer end of the sleeve 45 abuts the opposite end of the hub 19 of the bearing 20, and a nut 51 threaded on the coincident end of the shaft 32 and acting through the spacer mediums of the lever axis ends 53 and 52 and nut 50 to abut the shaft 32 with the coincident end of the hub 19, all form a means of preventing longitudinal movement of the shaft 32 and sleeve 45 in the bearing 20.

A nut 62 threaded on each of the planet gear carrying spindles 39 and 40 acts to retain the planet gears 37 and 38 in their respective positions of engagement with the sun gear segments.

Bearings 47, 49, 55 and 58 are formed respectively in the levers 46, 48, 54 and 56 for receiving pins (not shown) for the connecting of the respective individual brake rods to these levers, and the uniform transverse points of conversion from rock to straight line brake rod movements are indicated at 25 and 26 on one side and 27 and 28 on the other side of the central longitudinal line 6—6 of the chassis.

The operation of the invention follows:

Assuming the parts to be positioned as illustrated in Figs. 2 and 5 in which the brake mechanisms are released under their individual spring equipment influence, depressing the customary control member 29 to apply the brakes results in the pulley 30 being urged to move away from the compensating gearing unit, thus tending, through the medium of the cable 31, to urge, simultaneously and with equal force, the vertically oppositely disposed planet gear spindles 39 and 40 to move orbitally around their common axis toward the pulley 30. The result being that the respective planet gears 37 and 38 are urged orbitally through individual and diametrically opposite arcs, and the respective related pairs of sun gear segments 33 and 34 and 35 and 36 in turn being urged to move with their associate planet gears, which in turn results in the levers 46 and 54 being actuated whereby their lower extremities move forwardly (toward the vehicle engine), thus towing their respective separate rear wheel brake mechanism connections 22 and 24 forwardly. Similarly the levers 48 and 56 are actuated, but their lower extremities are moved rearwardly, thus towing their respective separate front wheel brake mechanism connections 21 and 23 rearwardly.

The pulley 30 and cable 31, operatively connecting the single control member 29 and the pair of pinions 37 and 38, operate as a primary equalizer allowing one of the pinions to differentiate in orbital movement with respect to the other. This affords that a differential of rock motion may take place between the diametrically opposite pairs of sun gear segments and accordingly a differential of motion between front and rear wheel brake rod connections 21 and 23 and 22 and 24 respectively, since the front wheel brake rods 21 and 23 are related, respectively, to the top pair of sun gear segments 33 and 34 and the rear wheel brake rods 22 and 24 are related, respectively, to the lower sun gear segments 35 and 36. Since the top differential sun gear segments 33 and 34 move forwardly and the lower differential sun gear segments 35 and 36 move forwardly, equalization between the front and rear pairs of four wheel brakes results.

By the separate sun gear segments 33 and 34 meshing with the planet gear 37 and said planet gear being revolvable around its own axis, this upper pair of simultaneously actuated sun gear members, respectively for operating separate front wheel brakes, are facilitated to move with their common associate planet gear 37 through its orbital arc and permitted to differentiate in response to their common associate planet gear, thus affording equalization between the two front wheel brakes 14 and 15. Similarly, by the separate sun gear segments 35 and 36 meshing with the planet gear 38 and said planet gear being revolvable around its own axis, this lower pair of simultaneously actuated sun gear members, respectively for operating separate rear wheel brakes, are facilitated to move with their associate planet gear 38 through its orbital arc and permitted to differentiate in response to their common associate planet gear, thus affording equalization between the two rear wheel brakes 16 and 17.

It will be seen that through the medium of the primary equalizer pulley and cable intermediaries 30 and 31 operative between the single control member 29 and the two independently orbitally movable planet gears 37 and 38, and through the medium of the cooperating secondary equalizer differential gearing units sun gear segments 33 and 34, and 35 and 36, respectively in pairs for front and rear wheel pairs of brakes, that each separate four wheel brake may wear or become out of adjustment relatively with one or all other of the separate four wheel brakes and still be applied with equal force to all the other wheel brakes, by virtue of the four point differential obtained of the two equalizers, namely the pulley and cable primary unit and the four sun gear segmentals to the two forming the secondary unit.

The usual springs (not shown) provided with each wheel brake mechanism will react, after the respective wheel brake has been applied, to return the respective associate sun gear segments back to their normal resting position. The reaction thus of a pair of differential sun gear segments commonly engaging a given planet gear will be to return the respective planet gear to its normal resting position, being the resting positions in which the respective members are shown in the accompanying drawings.

The novel division of a single sun wheel bevel gear member into four quadrantal segments; their arrangement operatively in two rocking movement planes of two sun segments each around a common axis; and their respective adaptation to provide an individual differential intermediary in the connection between a separate four wheel brake and a system of two planet gears arranged for independent orbital movement in a common orbital plane; together with the single pulley and cable system between these two planet gears and the single control member, constitutes a novelly and singularly inexpensive mechanical means for meeting the balanced force brake application virtues of hydraulic systems without the principal disadvantages of the latter in the lowest priced brackets with a true brake equalizing mechanism.

Thus it will be seen that I have provided a light, but rugged, and inexpensive mechanical four wheel brake equalizing mechanism that may be easily manufactured and of a character which should not require any servicing for the life of the vehicle.

The invention has been described with considerable detail and as applied to a motor vehicle in connection with which it has especial utility, but it is to be understood that, broadly speaking, the invention is capable of various adaptations and that the specific structure may be varied within wide limits without departing from the spirit of the invention as defined in the accompanying claims.

I claim as my invention:

1. In a brake equalizing mechanism a pair of bevel segmental differential sun gear members mounted for independent rocking movement in a common rock plane around a common axis, a pair of mating bevel planet gears for independent orbital movement in a common orbital plane around the rocking axis of said sun gear members, one of said planet gears engaging one and the other engaging the other of said pair of sun gear members, carrying means mounting each of said planet gears for rotation around its own axis and for independent orbital movement in the same orbital movement plane with the other planet gear, and means for simultaneously urging both planet gear carrying elements to rock toward a common point.

2. In a four brake equalizing mechanism, in combination; of a first equalizing system comprising a pulley for connection with the source of brake applying energy and a cable engaging said pulley; a second equalizing system comprising a plurality of four segmental sun gear parts arranged to form two side differential gear elements respectively of two sun gear segments for independent rocking movement in a common rock motion plane, two planet gear members respectively engaging one sun gear segment of each of the two side differential gear elements and each planet gear adapted to independent orbital movement, means mounting the two planet gears respectively for rotation around their own axes and for independent orbital movement in the same orbital motion plane around a common axis, means mounting said four sun gear segments in two side differential gear relations to said planet gears and respectively of each side differential gear element thereto for independent rocking movement in one rock motion plane around the common orbital axis of said planet gears; means connecting the two ends of said cable of the first equalizing system respectively to separate planet gear carriers of said second equalizing system; and means for connecting the four sun gear segments of said second equalizing system respectively to a separate brake mechanism of a four brake system.

3. In a planetary gearing compensating system for a multi-brake system, a sun gear element, a planet gear element, said sun gear element divided into four substantially quadrantal-shaped segments, said planet gear element comprising two planet gear members, means mounting said four sun gear segments in two rocking movement planes around a common axis, respectively, of two sun gear segments in each of the two rocking movement planes whereby each of said sun gear segments may rock differentially with all of the others, means mounting said two planet gear members in a common orbital movement plane around the common rocking movement axis of said sun gear segments whereby each of said planet gear members may rotate around its own axis and respectively move orbitally independently of each other, and each planet gear member engaging a separate sun gear segment of each of the two sun gear rocking movement planes.

4. In a brake control and in combination with a primary actuator and four brake mechanisms, a primary compensating system including means actuated by said primary actuator and having dual connections for operating separate other members, and a secondary compensating system comprising a planetary differential gearing having a sun gear element and a planet gear element, said sun gear element formed in four gear segments all for independent rocking movement around a common axis with the first two segments arranged for rocking movement in one rock movement plane and the second two segments arranged for rocking movement in a second rock movement plane, said planet gear element comprising two planet gears, each planet gear engaging a separate sun gear segment of each of the two rock motion planes, a separate orbital movement carrier for each planet gear, means supporting each sun gear segment and each planet gear carrier for independent rocking movement around a common axis, each of said operating connections of said primary compensating system connecting with a separate one of said planet gear carriers, and means operatively connecting each of the four sun gear segments with a separate one of the four brake mechanisms.

5. In a brake equalizing mechanism and in combination with four individual brake mechanism connections and a single first actuating member; of a first compensating system comprising a pulley in connection with said first actuating member and a cable engaging said pulley; and a second compensating system comprising a unitary planetary gearing assembly having four segmental sun gear parts respectively mounted for independent rocking movement all around a common axis and two planet gears mounted for independent orbital movement around the common axis of said sun gear segments, the first pair of said sun gear segments normally arranged in axial tandem alignment with each other on one side of said common axis and both engaging one and the same planet gear, the second pair of said sun gear segments normally arranged in axial tandem alignment with each other on the other side of said common axis, being substantially diametrically oppositely disposed relatively with said first tandem pair, and both engaging the other of said planet gears, one planet gear and engaging tandem pair of sun gear segments forming one differential gearing unit and the other planet gear and engaging tandem pair of sun gear segments forming a second differential gearing unit, means connecting each of the four sun gear segments to a separate one of said four individual brake mechanism connections, a separate orbital movement carrier for each planet gear, and the cable of said first compensating system being connected at its respective ends to a separate one of said planet gear carriers.

6. In a four wheel brake equalizing mechanism, a planetary compensating system comprising four segmental sun gear members mounted for independent rocking movement around a common axis, two of said members arranged in one and the same rocking plane and the other two of said members arranged in a second and the same rocking plane and in spaced relation along the said common axis for accommodating planet gear members therebetween, one segmental sun gear member of each of the two rocking planes forming one differential sun pair for a first pair of brakes and the other segmental sun gear member of each of the two rocking planes forming a second differential sun pair for a second pair of brakes, two planet gear members mounted for independent orbital movement around said common axis, one of said two planet gear members engaging each sun gear member of said first differential pair and the other of said two planet gear members engaging each sun gear member of said second differential pair, and means for actuating said two planet gear members simultaneously from a common energizing source.

7. In a four wheel brake equalizing planetary gearing, a shaft, one pair of segmental sun gear members mounted on said shaft respectively for independent rocking movement both occupying one and the same rocking plane and respectively normally disposed substantially diametrically oppositely with each other, a second pair of segmental sun gear members mounted on said shaft respectively for independent rocking movement both occupying a second one and the same rocking plane and respectively normally disposed substantially diametrically oppositely with each other, one sun gear segment of each of the two rocking planes forming a first differential pair for a first pair of brakes and the other sun gear segment of each of the two rocking movement planes forming a second differential pair for a second pair of brakes, two planet gears each acting as a common actuator to each sun gear segment of a separate differential pair, a separate orbital movement carrier for each of the two planet gears, and means cooperating with both planet gear carriers for urging said carriers to rotate simultaneously under equal influence.

8. A compensating system for converting a pull in a given direction to rock movements at four points around a common axis and permitting a differential of rocking movement between said four points of motion conversion comprising, a pulley consisting of the primary point of pull, a cable engaging said pulley, four segmental sun gear parts respectively mounted for independent rocking movement around a common axis, two planet gears, a separate carrier mounting each planet gear for independent orbital movement around said common axis, one planet gear engaging each of a first pair of said segmental sun gear parts and the other planet gear engaging each of a second pair of said sun gear parts, and one of said planet gear carriers connected to one end and the other to the second end of said cable.

9. A double differential compensating brake equalizing system comprising a single unitary planetary gearing assembly having the sun gear element formed of four segmental parts each mounted for independent rocking movement around a common axis with a first pair of said segments arranged in one rocking plane and the second pair of said segments arranged in a second rocking plane, and two planet gears mounted for independent orbitary movement around said common axis, one of said planet gears engaging one sun gear segment of each of the two rocking movement planes and the other planet gear engaging the other sun gear segment of each of the two rocking movement planes.

10. A single system of bevel differential gearing divided into a plurality of independently operating compensating systems comprising, a plurality of planet gears arranged and mounted each for independent orbital movement around a common axis and in a single orbital movement plane, and a plurality of segmental sun gear parts arranged and mounted each for independent rocking movement around said common axis and in two rocking movement planes respectively on either side of said planet gear common orbital movement plane, and each planet gear engaging a separate sun gear segment of each of the two sun gear rocking movement planes.

11. In a brake equalizing mechanism, the combination with a planetary gearing having a planet gearing element formed of a plurality of at least two planet gears each mounted for independent orbital movement around a common axis and all arranged in a common orbital movement plane around said axis, and having a sun gearing element formed of a plurality of at least four segmental sun gear parts each mounted for independent rocking movement around said common axis and all arranged and equally divided in two rocking movement planes with a separate sun gear segment of each of said two planes engaging each of said plurality of planet gears; of a separate rocking movement carrier for each of said plurality of planet gears; and means for simultaneously urging the plurality of separate planet gear carriers to rotate under equal influence.

12. In a brake equalizing planetary gearing, a shaft, two rock gear carrying spindle members mounted in a common rock plane for independent rocking movement around the axis of said shaft, two planet gears, one rotatable relative on each of said carrying spindles, four segmental sun gear parts mounted in pairs in two rock movement planes and each of said four parts for independent rocking movement around the axis of said shaft, and each planet gear engaging a separate sun gear segment of each of said two rock movement planes.

13. In a planetary gearing for equalizing a plurality of brake mechanisms, a plurality of segmental sun gear parts of a common gear tooth pitch circle arranged in a common rock motion plane and respectively mounted for independent rocking movement in said common plane around a common axis, and a plurality of planet gears equally the number of said segmental sun gear parts and arranged in a common orbital motion plane and respectively mounted for independent orbital movement around said common axis of said sun gears, and each planet gear engaging a separate sun gear segment.

14. In a brake equalizing mechanism, the combination with a first pair of segmentally formed differential gears for a first pair of brakes comprising two sun gear segments mounted for independent rocking movement in one common rock motion plane around a common rock axis, of a second pair of segmentally formed differential gears for a second pair of brakes comprising two other sun gear segments mounted for independent rock motion in a second common rock motion plane around said common rock axis, a dual system of planet actuators comprising two planet gears mounted for independent orbital movement in a common orbital plane around said common axis, and each planet gear engaging a separate sun gear segment of each of the two rock motion planes.

15. In a four wheel brake motor vehicle and in combination with a casing surrounding a member of the transmission element of said vehicle drive mechanism; of a bearing formed in said casing transverse to the axis of said transmission member; two concentric shafts mounted for relative rock motion in said bearing; a brake control compensating system comprising four segmental sun gears respectively mounted for independent rocking movement around the axis of said shafts, one of said sun gear segments being fixed to one of said shafts, a second of said sun gear segments being fixed to the other of said shafts, means affording an operating connection between each of said shafts and a separate brake mechanism of the two wheels on one side of said vehicle, means affording an operating connection between each other of said two sun gear segments and a separate brake mechanism of the other two wheels on the other side of said vehicle, two planet gears, each provided with a separate carrier respectively for independent rock motion in a common plane with each other around the axis of said shafts, one planet gear in mesh with a first pair of said sun gear segments including one sun segment fixed to one of said shafts, the other planet gear in mesh with the second pair of said sun gear segments including the sun segment fixed to the other of said shafts, and means for urging said separate planet gear carriers to rock around the axis of said shafts simultaneously and with equal urge.

16. In a motor vehicle four wheel brake equalizing mechanism, the combination with a pulley adapted to act as a primary force distributor and a cable engaging said pulley, and the four wheel brake individual operating connections; of a planetary compensating system for equally distributing the pull from the two ends of said cable to said four brake operating connections, said system comprising four coaxial segmental sun gear parts arranged to form longitudinally aligned and diametrically oppositely opposing pairs of sun gear tracks, two planet gears, one engaging one and the other engaging the other of said pairs of sun gear segments, a separate carrier for each planet gear whereby said planet gears may be moved orbitally differentially, said cable connecting at one end to one and the other end to the other of said separate planet gear carriers, and means operatively connecting each of said four sun gear segments to a separate one of said four wheel brake individual operating connections.

17. In a four brake equalizing mechanism, the combination with a pulley adapted to act as a primary force distributor and a cable engaging said pulley and the four brake individual operating connections; of a unitary double planetary compensating system for equally distributing a pull urge from one end of said cable to a first pair of said individual brake operating connections and for equally distributing a pull urge from the other end of said cable to a second pair of said individual brake operating connections, said gearing compensating system comprising an upper pair of segmental sun gear parts respectively mounted for independent rocking movement around a common axis, a first planet gear for orbitary movement around said common axis and engaging each of said upper pair of sun gear segments, a first orbital movement carrier for said planet gear and connected to one end of said cable, a lower pair of segmental sun gear parts respectively mounted for independent rocking movement around said common axis, a second planet gear mounted for orbitary movement around said common axis and engaging each of said lower pair of sun gear segments, a separate orbital movement carrier for said second planet gear and connected to the other end of said cable, and means operatively connecting each of the two pairs of sun gear segments to a separate one of said four brake individual operating connections.

18. In a brake equalizing mechanism, planetary compensating gearing, a pair of independently rocking planet gear spindles having a common rocking axis, a control member, a pulley, means operatively connecting said pulley to said control member, a cable engaging said pulley, and said cable connecting at one end to one and at the other end to the other of said pair of planet gear spindles.

19. In a brake equalizing mechanism, two planet gears mounted for independent orbitary movement in a common orbitary motion plane around a common orbital movement axis, four segmental sun gear parts two engaging each planet gear, a first pair of said sun gear segments arranged for rocking movement in one common plane and mounted for independent rocking movement around the common orbital movement axis of said planet gears, and the other pair of said sun gear segments arranged for rocking movement in a second plane and mounted for independent rocking movement around the same axis as said first pair.

20. A brake equalizing planetary gearing compensating system having its sun gearing element divided in four segmental parts all mounted for independent rocking movement around a common axis, with two of said parts occupying a first common rock motion plane and the other two of said parts occupying a second common rock motion plane.

HENRY M. GRINSLADE.